United States Patent [19]
Baba

[11] Patent Number: 5,485,478
[45] Date of Patent: Jan. 16, 1996

[54] ION LASER GENERATOR

[75] Inventor: Kenji Baba, Tokyo, Japan

[73] Assignee: NEC Corporation, Japan

[21] Appl. No.: 38,606

[22] Filed: Mar. 29, 1993

[30] Foreign Application Priority Data

Apr. 8, 1992 [JP] Japan .................................. 4-086769

[51] Int. Cl.[6] .................................................. H01S 3/00
[52] U.S. Cl. .................................... 372/37; 372/88
[58] Field of Search ........................... 372/37, 58, 88, 372/103

[56] References Cited

U.S. PATENT DOCUMENTS 3,745,483  7/1973  Huchital et al. ................. 372/37
3,993,965  11/1976  Alves et al. ..................... 372/37
4,974,228  11/1990  Petersen ......................... 372/37
5,115,439  5/1992  Howard .......................... 372/37

*Primary Examiner*—Rodney B. Bovernick
*Assistant Examiner*—Robert E. Wise
*Attorney, Agent, or Firm*—Laff, Whitesel, Conte & Saret, Ltd.

[57] ABSTRACT

In an ion laser generator, an electromagnet must produce a sufficiently strong magnetic field throughout the length of the bore where plasma must be converged, and the magnetic field intensity at the end surface of the cathode must not exceed a certain limit. If the magnetic field intensity at the cathode is too strong, the plasma is converged on an area of the cathode and destroys the cathode at the area. A magnetic shield member is provided at an end surface of the electromagnet facing to the cathode for shielding the cathode surface from the leakage flux.

4 Claims, 4 Drawing Sheets

ION LASER GENERATOR

BACKGROUND OF THE INVENTION

This invention relates to an ion laser generator.

An ion laser tube comprises a bore, through which plasma is conducted, a cathode for plasma discharge facing to an end of the bore, an anode for plasma discharge facing to the other end of the bore, a pair of Brewster windows for transmitting laser light. And an ion laser generator comprises an ion laser tube, an electromagnet surrounding the ion laser tube, and a pair of light resonating mirrors situated at both ends of the ion laser tube. An electric voltage is impressed between the cathode and the anode for generating the plasma, and an exciting current flows in the electromagnet to generate a magnetic field for converging the plasma around the axis of the bore. When the ion laser tube discharges, the laser light is resonated by the pair of resonating mirrors, and a part of laser light is taken out through one of the light resonating mirrors.

For a numerical example, a magnetic field of about 1000 gauss is required at the bore for a sufficient convergence of the plasma, whereas the magnetic field at the end surface of the cathode must be less than 100 gauss. When the magnetic field at the end surface of the cathode is stronger than 100 gauss, the plasma is concentrated on an area of the cathode and destroys the cathode at the area. On the other hand, when the magnetic field at the bore is not strong enough, insufficient convergence of plasma makes plasma sputtering strong, and sputtered material will stain the Brewster windows.

In a heretofore known ion laser generator, the electromagnet for converging the plasma must be positioned with a sufficient distance apart from the end surface of the cathode in order to obtain a sufficiently decreased magnetic field intensity at the end surface of the cathode while keeping a sufficiently strong magnetic field at the end surface of the bore.

An increase in the distance between the end surface of the cathode and that of the bore decreases the length of the bore in a limited length of an ion laser tube. Since the laser light is generated only in the bore, decrease of the bore length decreases the intensity of the laser output in a limited length of an ion laser tube. This means that the length of an ion laser tube is not effectively used in a heretofore known ion laser generator.

SUMMARY OF THE INVENTION

Therefore, a primary object of the present invention is to obtain an ion laser generator in which the length of an ion laser tube is effectively used for generating laser light. In order to achieve this object, the end surface of the cathode must be placed as near as possible to that of the bore in an ion laser tube. And, in this reduced distance between the end surface of the cathode and that of the bore, the magnetic field at the end surface of the cathode must be sufficiently ak, while the magnetic field at the end surface of the bore must be sufficiently strong.

In this invention, a magnetic shield is provided between the end surface of the bore and the end surface of the cathode. A part of magnetic flux at the end surface of the bore enters into this magnetic shield member, and the magnetic field intensity(that is the flux density) at the end surface of the cathode is decreased.

BRIEF DESCRIPTION OF THE DRAWINGS

Further objects, features, and advantages of this invention will become apparent from a consideration of the following description, the appended claims, and the accompanying drawings in which the same numerals indicate the same or the corresponding parts.

DETAILED DESCRIPTION OF THE PREFERRED EMBODIMENTS

Figure 1:
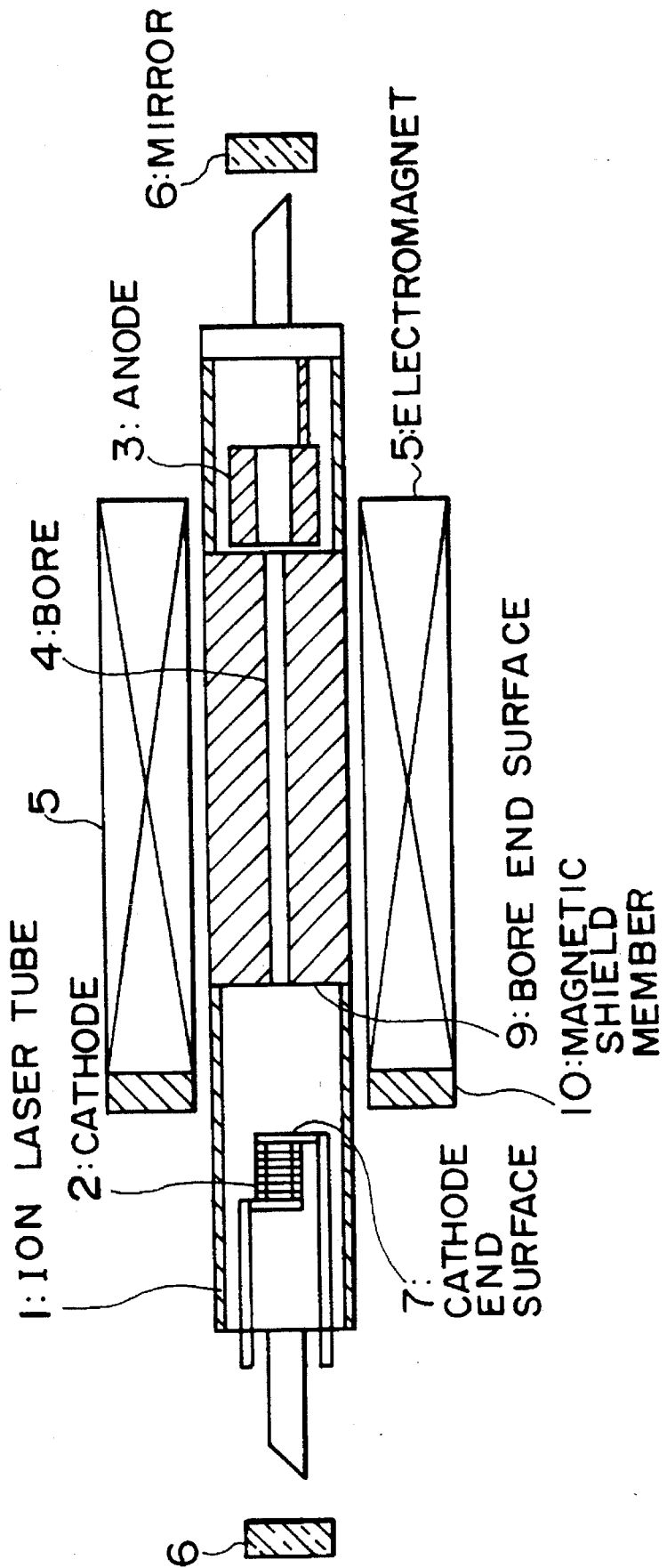
FIG. 1 shows a crosssectional view of an embodiment of this invention.
Figure 2:
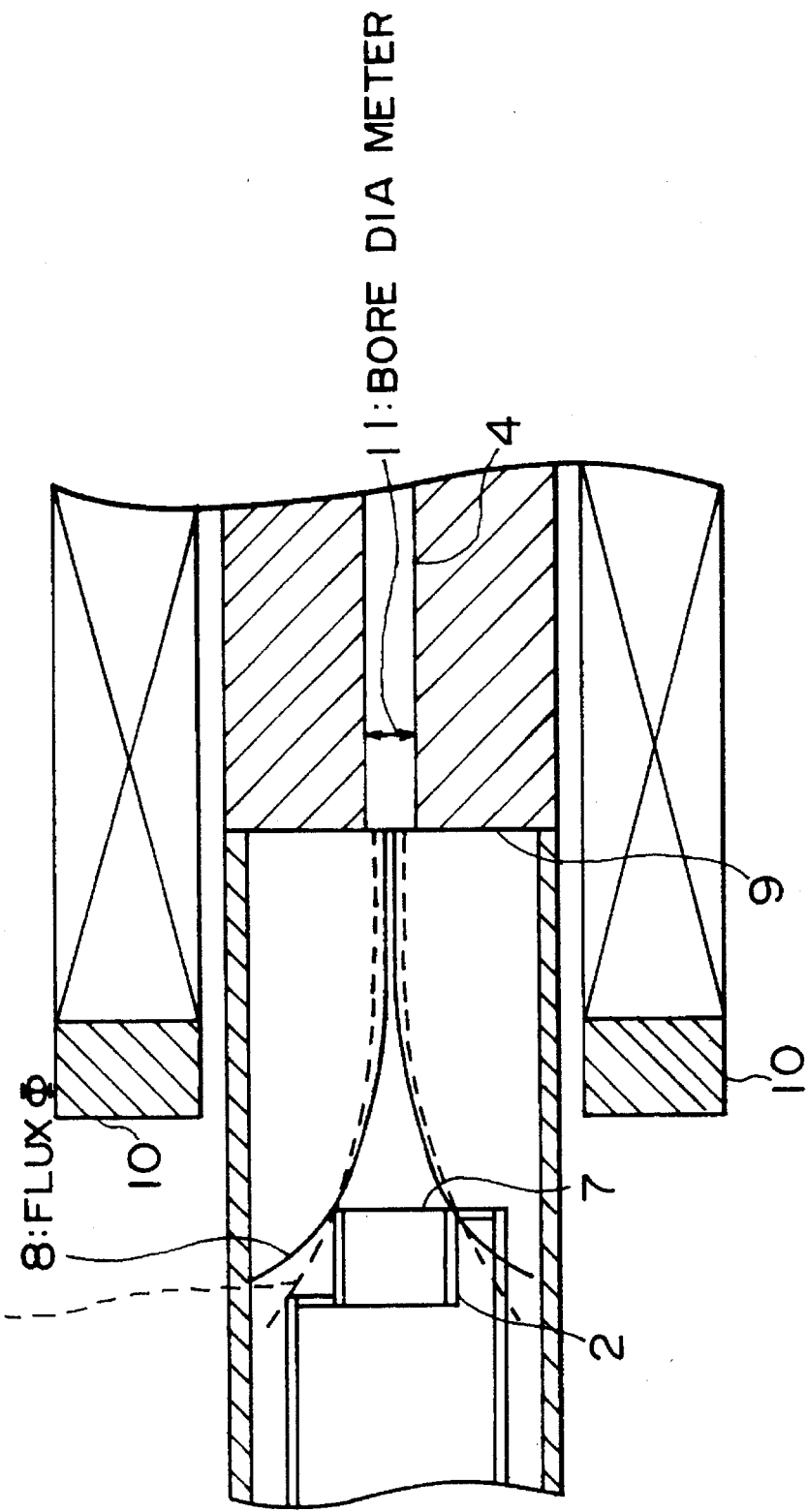
FIG. 2 is enlarged view illustrating the vicinity of the cathode in FIG. 1.

Referring to FIG. 1 and FIG. 2, an ion laser tube 1 is a hermetically shield tube including a cathode 2, an anode 3, and a bore 4. The cathode 2 emits electrons, and a voltage impressed between the cathode 2 and the anode 3 generates plasma. A plasma converging electromagnet 5 is placed surrounding the ion laser tube 1. The magnetic field of the electromagnet 5 converges the plasma around the axis of the bore 4. A pair of reflecting mirrors 6 are placed facing to both ends of the ion laser tube 1. When a wavelength of a light in the plasma resonates to the distance between the two reflecting mirrors, laser light of the wavelength is generated.

In this invention, the end surface 7 of the cathode 2 is positioned nearer to the end surface 9 of the bore 4 than in heretofore known ion laser oscillators. And a magnetic shield member 10 for terminating a part of magnetic flux from the end surface 9 of the bore 4, reduces the magnetic field strength at the end surface 7 of the cathode.

For a numerical example, a magnetic field strength at the end surface 7 is made less than 100 gauss, for this order of a magnetic field strength is proved to be safe to the life span of the cathode 2. A stronger magnetic field at the end surface 7 converges the plasma at a place of the end surface 7 and deteriorates the cathode 2 at the place.

Figure 4:
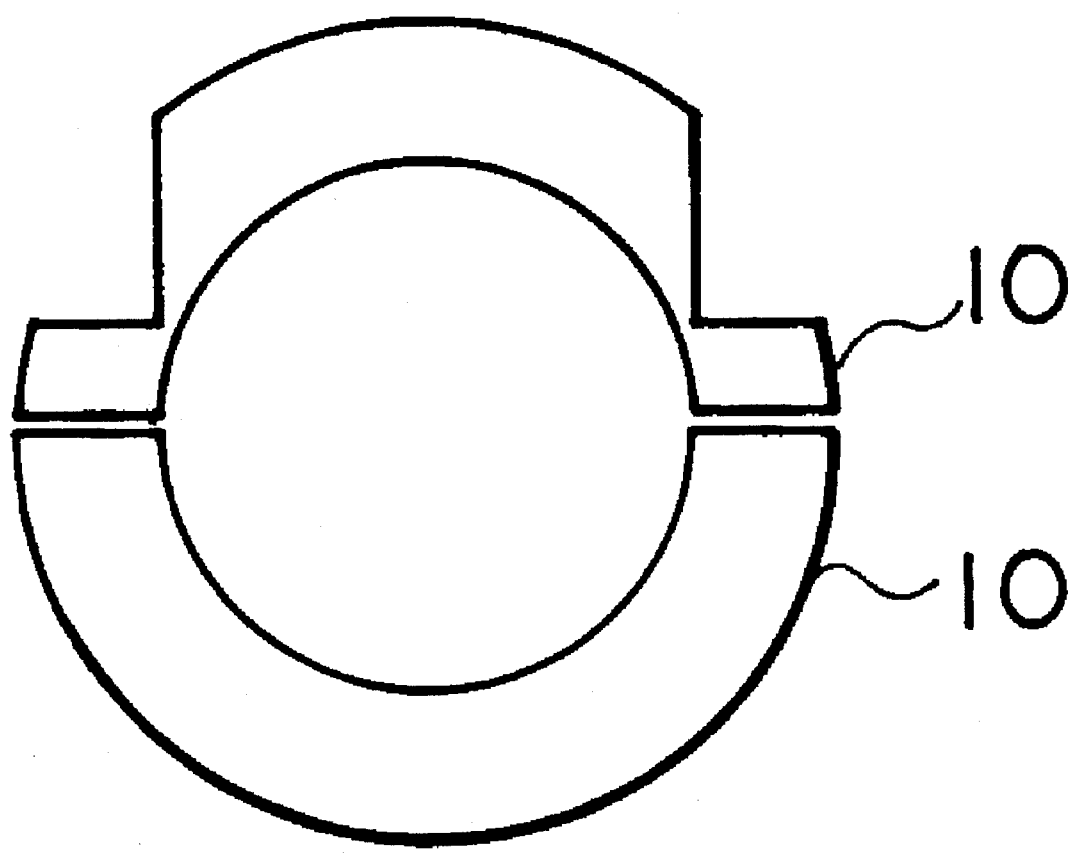
FIG. 4 shows a side view of an embodiment of a magnetic shield member of this invention.

An example of the magnetic shield member 10 is shown in FIG. 4 as a ring-shaped member split in two sections across the diameter. The magnetic shield member 10 is made of a ferromagnetic material and has a thickness of, for example, 10 mm.

Figure 3:
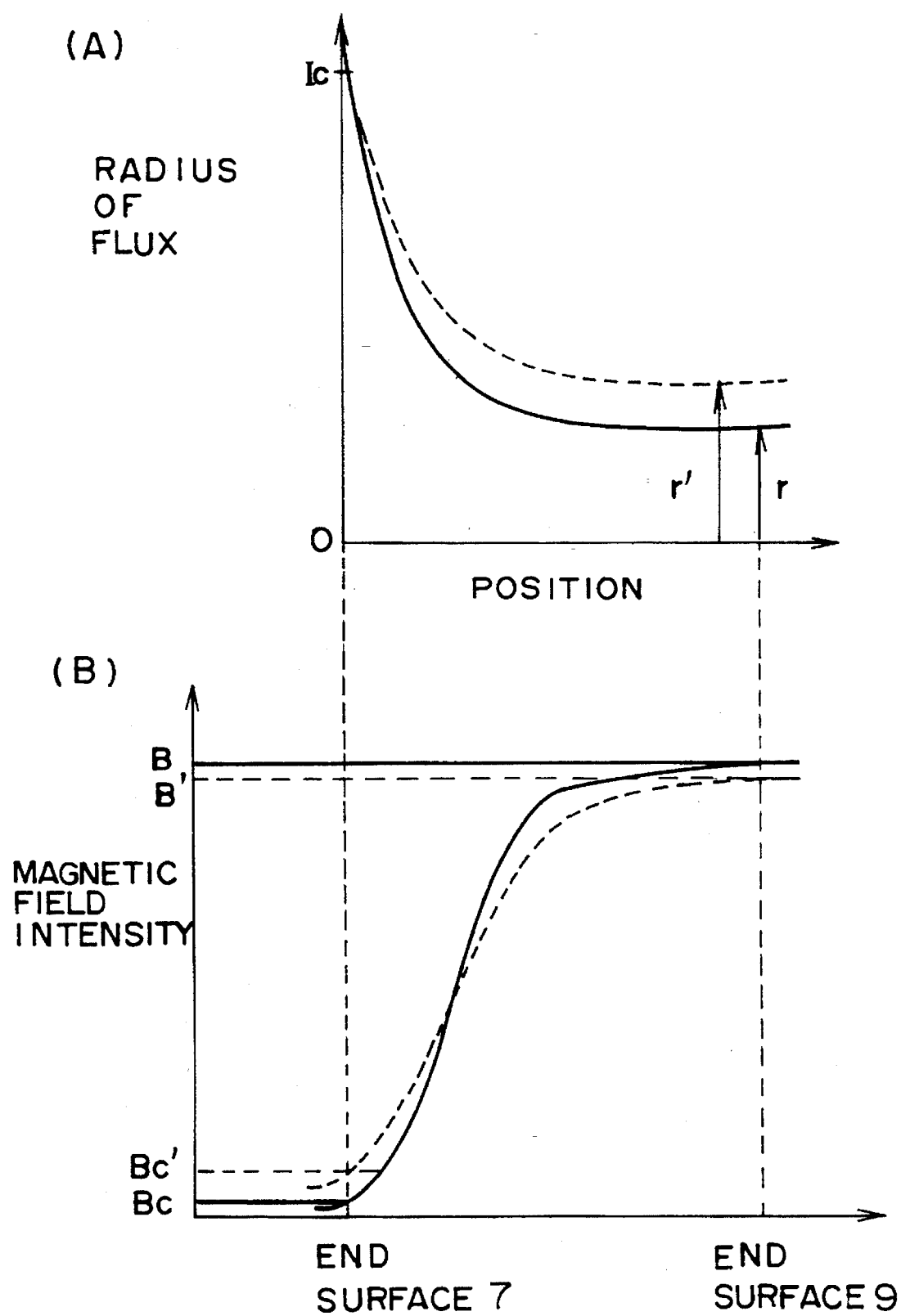
FIG. 3 illustrates an effect of this invention.

The workings of the magnetic shield member 5 is illustrated in FIG. 2 and FIG. 3. A pair of solid lines 8 in FIG. 2 illustrates a range of magnetic flux entering into the end surface 7 when the magnetic shield member 10 is provided. And a pair of dotted lines 12 in FIG. 2 illustrates a range of magnetic flux entering into the end surface 7.

Magnetic flux going out from an end surface of the electromagnet 5 comes back to the other end surface of the magnet 5, and when a ferromagnetic member is in the flux path, the flux tends to take a path in the ferromagnetic member. Thus, when the magnetic shield member 10 is provided at an end surface of the electromagnet 5, a part of the magnetic flux going out from the end surface of the electromagnet 5 comes in the magnetic shield member 10, leaving less flux to be entered in the end surface 7 of the cathode When the end surface 7 is a circle of radius $r_c$ and the magnetic field intensity at the end surface 7 is denoted by $B_c$ for flux represented by solid lines 8, and by $B_c'$ for flux represented by broken lines 12, the total number of flux $\Phi$ entering into the end surface 7 is $\Phi=B_c\pi r_c^2$ for flux represented by solid lines and $\Phi'=B_c'\pi r_c^2$ for flux represented by dotted lines 12.

When the magnetic field intensity of the flux $\Phi$ is B, the radius of the flux is r, the magnetic field intensity of the flux $\Phi'$ is B', and the radius of the flux r' at the end surface 9 of the bore, $\Phi=B\pi r_2$ and $\Phi'=B'\pi(r')^2$. Thus, $B_c\pi r_c^2 = B\pi r^2$ ... (1) and $B_c'\pi r_c^2 = B'\pi(r')^2$ ... (2). And in general, for a point d between the end surface 7 and the end surface 9, $\Phi=B_d\pi r_d^2$ and $\Phi'=B_d'\pi(r_d')^2$, where $r_d(r_d')$ is the radius of the flux and $B(B_d')$ is the magnetic field intensity at point d. And therefore, $B_c\pi r_c^2 = B_d\pi r_d^2$ ... (3) and $B_c'\pi r_c^2 = B_d'\pi(r_d')^2$ ... (4).

The relation represented by equation(3) is illustrated by solid lines in FIG. 3, and the relation represented by equation(4) is illustrated by dotted lines. In FIGS. 3, the X axis denotes a position between the two end surfaces, and the Y axis denotes the radius of the flux and that of FIG. 2B denotes the magnetic field intensity of the flux $\Phi$ and $\Phi'$. As seen in FIG. 3, the magnetic field intensity at the end surface 7 is substantially reduced by an effect of the magnetic shield member 10, while the magnetic field intensity at the end surface 9 of the bore 4 is rather intensified by the magnetic shield member 10.

From equations (1) and (2), we obtain, $(r/r')^2=(B_c/B_c')(B'/B)$ ... (5). For a numerical example of a magnetic shield member of 10 mm thickness, $(B_c/B_c')=0.87$ and $(B'/B)=0.997$. Calculated by equation(5), $(r/r')=0.93$. For another example of a magnetic shield member of 30 mm thickness, $(B_c/B_c')=0.55$ and $(B'/B)=0.995$. Calculated by equation(5), $(r/r')=0.74$.

As shown in FIG. 2, the radius r of the flux $\Phi$ is made smaller than that of the bore 4. The diameter of the bore 4 is denoted by 11 in FIG. 2.

In the embodiment shown in FIG. 2, the end surface of the electromagnet 5 is placed between the end surface 7 of the cathode and the end surface 9 of the bore, and a magnetic shield member 10 is placed abutted on the end surface of the electromagnet 5. But the position of the magnetic shield member 10 is not limited by this embodiment. A magnetic shield member placed in a flux path outside the electromagnet 5 can absorb a part of magnetic flux and can reduce an amount of leakage flux entering in the end surface 7 of the cathode.

And more than one magnetic shield member may be inserted for multiple shielding. In another embodiment of this invention, a magnetic shield member 10 may be provided at either end of the electromagnet 5.

In this way, the distance between the end surface 7 of the cathode 2 and the end surface 9 of the bore 4 is effectively decreased in an ion laser generator of this invention. This decreased distance increases the effective length of the bore in a limited length of an ion laser tube to the effect of increased output of the laser light.

What is claimed is:

1. An ion laser generator comprising:

an ion laser tube having a bore and a pair of discharge electrodes comprising a cathode and an anode, said cathode being positioned at a distance from and facing a first end surface of said bore, and said anode being positioned facing a second end surface of said bore;

an electromagnet for converging plasma generated between said pair of discharge electrodes, around a center axis of said bore;

an end surface of said electromagnet facing the cathode and being positioned between the first end surface of said bore and an end surface of said cathode, a magnetic shield member provided in a flux path outside the electromagnet, said magnetic shield member comprising a ferromagnetic member abutting an end surface of the electromagnet, said end surface of said electromagnet being an end surface which is nearer to an end surface of said cathode, and said magnetic shield member converging a total flux entering said end surface of said cathode to a cross-sectional area which is less than the cross-sectional area of said bore at the first end surface of said bore;

an end surface of said magnetic shield member facing the cathode being positioned between said first end surface of said bore and an end surface of said cathode, said end surfaces of said electromagnet and said magnetic shield member being arranged to converge a total magnetic flux passing an entire area of said end surface of said cathode at said first end surface of said bore, said convergence reducing said total magnetic flux to an area which is smaller than a cross-sectional area of said bore and to reduce a magnetic intensity at said end surface of said cathode to less than 100 Gauss; and a pair of reflecting mirrors, each of said mirrors being placed facing an individually associated one of two output ends of said ion laser tube, and a distance between said pair of reflecting mirrors being tuned to a wavelength of a laser light generated in said plasma.

2. An ion laser generator according to claim 1, wherein said magnetic shield member comprises a ring-shaped disk split across a diameter of said disk.

3. An ion laser generator comprising;

an ion laser tube having two output ends, a bore, and a pair of discharge electrodes comprising a cathode and an anode, said cathode being positioned a distance from and facing a first end surface of said bore, and said anode being positioned facing a second end surface of said bore;

an electromagnet for converging plasma generated between said pair of discharge electrodes, said plasma being converged around a center axis of said bore, an end surface of said electromagnet facing the cathode being positioned between said first end surface of said bore and an end surface of said cathode, a magnetic shield member comprising a ring-shaped disk split across a diameter thereof, said magnetic shield member being located in a flux path outside the electromagnet, said magnetic shield member abutting an end surface of the electromagnet, said end surface of said electromagnet being an end surface which is nearer to an end surface of said electromagnet, and said magnetic shield member converging a total magnetic flux entering said end surface of said cathode to a cross-sectional area of said bore at the first end surface of said bore;

an end surface of said magnetic shield member facing the cathode being positioned between said first end surface of said bore and an end surface of said cathode, said end surfaces of said electromagnet and said magnetic shield member being arranged to converge a total magnetic flux passing an entire area of said end surface of said cathode at said first end surface of said bore, said convergence being to an area which is smaller than a cross-sectional area of said bore and to reduce magnetic intensity at said end surface of said cathode to less than 100 Gauss; and a pair of reflecting mirrors, each mirror facing an individually associated one of said output ends of said ion laser tube, a distance between said pair of reflecting mirrors being tuned to a wavelength of a laser light generated in said plasma.

4. An ion laser generator comprising;

an ion laser tube having a bore with opposing end surfaces, and a pair of discharge electrodes comprising a cathode and an anode, said cathode being positioned at a distance from and facing one of said end surfaces of said bore, and said anode being positioned facing the other of said end surfaces of said bore;

an electromagnet for converging plasma generated between said pair of discharge electrodes, said plasma converging around center axis of said bore, an end surface of said electromagnet facing the cathode and being positioned between said one end surface of said bore and an end surface of said cathode, a magnetic shield member comprising a ring-shaped disk split across the diameter thereof and located in a flux path outside the electromagnet, said magnetic shield member being placed abutting an end surface of the electromagnet, said end surface of said electromagnet being nearer to said one end surface of said bore, and said magnetic shield member converging a total flux entering said end surface of said cathode, said convergence being to a cross-sectional area which is less than the cross-sectional area of said bore at said one end surface of said bore;

an end surface of said magnetic shield member facing the cathode being positioned between said one end surface of said bore and an end surface of said cathode, said end surfaces of said electromagnet and said magnetic shield member being arranged to converge a total magnetic flux passing an entire area of said end surface of said cathode at said one end surface of said bore, said convergence reducing said flux to an area which is smaller than a cross-sectional area of said bore; and a pair of reflecting mirrors, each of said mirror being placed facing an individually associated one of said ends of said ion laser tube, and a distance between said pair of reflecting mirrors being tuned to a wavelength of a laser light generated in said plasma.

* * * * *